United States Patent
Hwang et al.

(10) Patent No.: US 9,703,841 B1
(45) Date of Patent: Jul. 11, 2017

(54) CONTEXT-BASED NOTIFICATIONS IN MULTI-APPLICATION BASED SYSTEMS

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/338,167

(22) Filed: Oct. 28, 2016

(51) Int. Cl.
*G06F 17/30* (2006.01)

(52) U.S. Cl.
CPC .... *G06F 17/3053* (2013.01); *G06F 17/30867* (2013.01)

(58) Field of Classification Search
USPC .................................. 707/706, 723
See application file for complete search history.

(56) References Cited

U.S. PATENT DOCUMENTS

| | | | |
|---|---|---|---|
| 6,429,812 B1 | 8/2002 | Hoffberg | |
| 6,947,995 B2 | 9/2005 | Chang et al. | |
| 7,881,234 B2 | 2/2011 | Abernethy, Jr. et al. | |
| 7,895,594 B2 | 2/2011 | Kirilline et al. | |
| 8,037,062 B2 * | 10/2011 | Baris | G06F 17/30545 707/723 |
| 8,271,107 B2 | 9/2012 | Bodin et al. | |
| 8,484,199 B1 * | 7/2013 | Katragadda | G06F 17/30241 701/426 |

(Continued)

FOREIGN PATENT DOCUMENTS

| | | |
|---|---|---|
| JP | H0519729 A | 1/1993 |
| WO | 2011064168 A1 | 6/2011 |
| WO | 2015103067 A1 | 7/2015 |

OTHER PUBLICATIONS

Fidelman, M., "Why 99.9% of All Mobile Games are Not Profitable: The 6 Things Mobile Game Developers Must Do to Survive," Business Insider, retrieved from http://www.businessinsider.com/why-999-of-all-mobile-games-are-not-profitable-the-6-things-mobile-game-developers-must-do-to-survive-2012-3, Feb. 28, 2012, pp. 1-6.

(Continued)

*Primary Examiner* — Kim Nguyen

(74) *Attorney, Agent, or Firm* — Zilka-Kotab, P.C.

(57) ABSTRACT

A computer-implemented method to coordinate output of an application over a single computing device, according to one embodiment, includes receiving a feed of importance scores for each of the plurality of applications, and normalizing the importance scores of each feed for each of the plurality of applications. At least some applications with feeds of importance scores are selected. A prioritization score is assigned to the selected applications based on a function of the normalized importance scores of the selected applications. The normalized importance scores of the selected applications are combined into a single feed, and the single feed of normalized importance scores of selected applications is provided in order of priority to a subscribing application. An output of the subscribing application is coordinated based on the normalized importance scores of selected applications with a high priority in the single feed.

20 Claims, 6 Drawing Sheets

(56) References Cited

U.S. PATENT DOCUMENTS

| | | | |
|---|---|---|---|
| 8,484,205 B1* | 7/2013 | Cohen | G06Q 30/02 707/637 |
| 8,745,041 B1* | 6/2014 | Katragadda | G06F 17/30241 701/426 |
| 8,825,759 B1* | 9/2014 | Jackson | H04L 67/02 705/14.69 |
| 8,914,496 B1 | 12/2014 | Richardson et al. | |
| 8,930,340 B1* | 1/2015 | Sobol | G06F 17/30864 707/706 |
| 8,954,364 B2 | 2/2015 | Lillethun et al. | |
| 8,971,690 B2 | 3/2015 | Gresham et al. | |
| 8,971,968 B2 | 3/2015 | Aurongzeb et al. | |
| 9,026,609 B2 | 5/2015 | Oliver et al. | |
| 9,075,435 B1 | 7/2015 | Noble et al. | |
| 9,336,070 B1 | 5/2016 | Parker et al. | |
| 9,456,181 B2* | 9/2016 | Moorjani | H04N 7/15 |
| 2006/0230427 A1 | 10/2006 | Kunkel et al. | |
| 2007/0053527 A1 | 3/2007 | Barbieri et al. | |
| 2011/0197225 A1 | 8/2011 | Kitashou | |
| 2013/0173716 A1 | 7/2013 | Rogers | |
| 2013/0297547 A1 | 11/2013 | Ding et al. | |
| 2014/0223443 A1 | 8/2014 | Ashok et al. | |
| 2014/0257826 A1 | 9/2014 | Laaksonen | |
| 2014/0366040 A1 | 12/2014 | Parker et al. | |
| 2015/0011195 A1 | 1/2015 | Li | |
| 2016/0227165 A1* | 8/2016 | Moorjani | H04N 7/15 |
| 2016/0239918 A1* | 8/2016 | Lambur | G06Q 40/06 |

OTHER PUBLICATIONS

Kishore, A., "Why quality of experience is the most critical metric for internet video profitability," The Guardian, retrieved from http://www.theguardian.com/media-network/media-network-blog/2013/aug/07/internet-video-profitability-metric, Aug. 7, 2013, pp. 1-4.

Yan et al., "Fast App Launching for Mobile Devices Using Predictive User Context," MobiSys'12, Jun. 25-29, 2012, pp. 1-14.

Lindqvist et al., "Undistracted Driving: A Mobile Phone that Doesn't Distract," HotMobile '11 Mar. 1-2, 2011, pp. 1-6.

Mehrotra et al., "Ask, But Don't Interrupt: The Case for Interruptibility-Aware Mobile Experience Sampling," UbiComp/ISWC '15 Adjunct, Sep. 7-11, 2015, pp. 1-10.

Bram, "Contextual Notifications Are Just Getting Started," Feb. 13, 2014, pp. 1-4, Retrieved From http://www.getsaga.com/blog/contextual-notifications-are-just-getting-started/.

Zou et al., "Prophet: What App You Wish to Use Next," UbiComp '13, Sep. 8-12, 2013, pp. 1-4.

Wikipedia, "Context Switch," Oct. 18, 2016, pp. 1-3, Retrieved From, https://en.wikipedia.org/wiki/Context_switch.

Likamwa et al., "MoodScope: Building a Mood Sensor from Smartphone Usage Patterns," MobiSys'13, Jun. 25-28, 2013, pp. 1-13.

Markets and Markets, "Mobile Mapping Market worth 26.60 Billion USD by 2020," Apr. 2, 2016, pp. 1-3, Retrieved From http://www.marketsandmarkets.com/PressReleases/mobile-mapping.asp.

Liu et al., U.S. Appl. No. 14/967,977, filed Dec. 14, 2015.

* cited by examiner

CONTEXT-BASED NOTIFICATIONS IN MULTI-APPLICATION BASED SYSTEMS

BACKGROUND

The present invention relates to multi-application based systems on a mobile computing device and more specifically, this invention relates to a method to prioritize applications based on user context on a mobile computing device.

Multiple applications often run simultaneously on mobile devices, for example smart phones, tablets, watches, etc. Two or more applications may be in the foreground of the operating system at the same time and thus may compete for output notifications, either by audio, visual, haptic, or textual responses. Thus, the interruption of one application with a notification from another application may interfere with the user's quality of experience. For example, while a user is listening to a podcast on the mobile device, the turn-by-turn navigation application interrupts the podcast with directions. The interruption by the turn-by-turn application may compete with the audio output and subsequently talk over the podcast without the podcast pausing. The user may miss a critical section of the podcast and receive a non-urgent direction instead.

SUMMARY

A computer-implemented method to coordinate output of an application over a single computing device where the device has a plurality of applications, according to one embodiment, includes receiving a feed of importance scores for each of the plurality of applications where the feed of importance score is derived from a time series of values of context use in real time. The importance scores of each feed for each of the plurality of applications are normalized. At least some applications with feeds of importance scores are selected where the selection is based on predefined criteria. A prioritization score is assigned to the selected applications based on a function of the normalized importance scores of the selected applications. The normalized importance scores of the selected applications are combined into a single feed where an order of priority of normalized importance scores in the single feed is based on the prioritization score of each selected application. The single feed of normalized importance scores of selected applications is provided in order of priority to a subscribing application. An output of the subscribing application is coordinated based on the normalized importance scores of selected applications with a high priority in the single feed.

A computer program product for coordinating output of an application over a single computing device having a plurality of applications, according to one embodiment, includes a computer readable storage medium having program instructions embodied therewith where the computer readable storage medium is not a transitory signal per se. The program instructions are executable by a processing circuit to cause the processing circuit to perform a method that includes receiving by the processing circuit a feed of importance scores for each of the plurality of applications where the feed of importance score is derived from a time series of values of context use in real time. The processing circuit normalizes the importance scores of each feed for each of the plurality of applications. The processing circuit selects at least some applications with feeds of importance scores where the selection is based on predefined criteria. The processing circuit assigns a prioritization score to the selected applications based on a function of the normalized importance scores of the selected applications. The processing circuit combines the normalized importance scores of the selected applications into a single feed where an order of priority of normalized importance scores in the single feed is based on the prioritization score of each selected application. The processing circuit provides the single feed of normalized importance scores of selected applications in order of priority to a subscribing application. The processing circuit coordinates an output of the subscribing application based on the normalized importance scores of selected applications with high priority in the single feed.

Other aspects and embodiments of the present invention will become apparent from the following detailed description, which, when taken in conjunction with the drawings, illustrate by way of example the principles of the invention.

DETAILED DESCRIPTION

Figure 1:
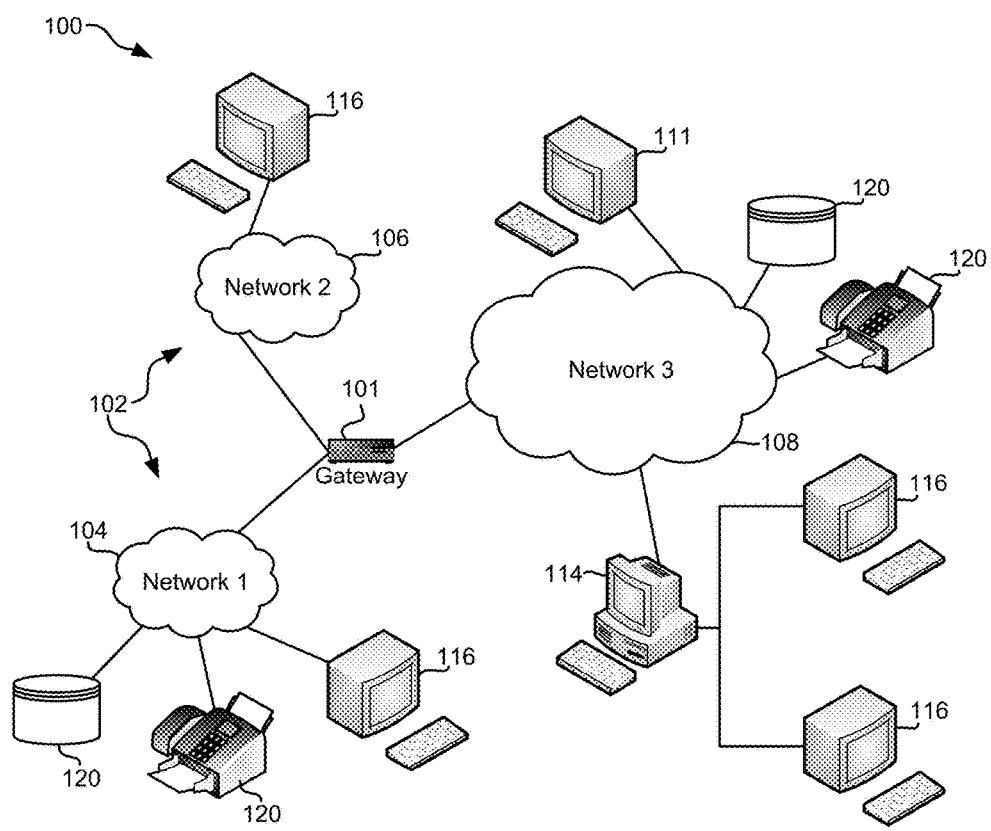
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing context-based notifications in multi-application based systems. Some embodiments enable a management system that prioritizes multiple applications in concurrent operation so that the applications work together to deliver information according to appropriate context.

In one general embodiment, a computer-implemented method to coordinate output of an application over a single computing device where the device has a plurality of applications includes receiving a feed of importance scores for each of the plurality of applications where the feed of importance score is derived from a time series of values of context use in real time. The importance scores of each feed for each of the plurality of applications are normalized. At least some applications with feeds of importance scores are selected where the selection is based on predefined criteria. A prioritization score is assigned to the selected applications based on a function of the normalized importance scores of the selected applications. The normalized importance scores of the selected applications are combined into a single feed where an order of priority of normalized importance scores in the single feed is based on the prioritization score of each selected application. The single feed of normalized importance scores of selected applications is provided in order of priority to a subscribing application. An output of the subscribing application is coordinated based on the normalized importance scores of selected applications with a high priority in the single feed.

In another general embodiment, a computer program product for coordinating output of an application over a single computing device wherein the device has a plurality of applications includes a computer readable storage medium having program instructions embodied therewith where the computer readable storage medium is not a transitory signal per se. The program instructions are executable by a processing circuit to cause the processing circuit to perform a method that includes receiving by the processing circuit a feed of importance scores for each of the plurality of applications where the feed of importance score is derived from a time series of values of context use in real time. The processing circuit normalizes the importance scores of each feed for each of the plurality of applications. The processing circuit selects at least some applications with feeds of importance scores where the selection is based on predefined criteria. The processing circuit assigns a prioritization score to the selected applications based on a function of the normalized importance scores of the selected applications. The processing circuit combines the normalized importance scores of the selected applications into a single feed where an order of priority of normalized importance scores in the single feed is based on the prioritization score of each selected application. The processing circuit provides the single feed of normalized importance scores of selected applications in order of priority to a subscribing application. The processing circuit coordinates an output of the subscribing application based on the normalized importance scores of selected applications with high priority in the single feed.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
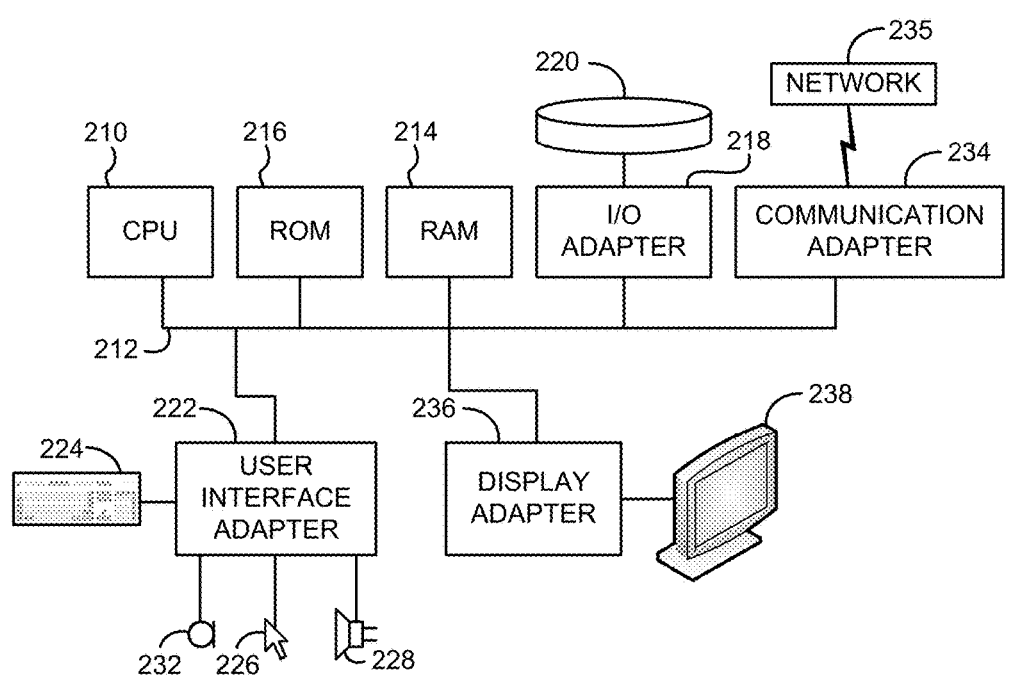
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

A user may run multiple applications simultaneously on the operating system of a mobile computing device. Multiple applications may be in the foreground of the operating system at the same time and compete for output response activity, for example, audio or visual responses. Alternatively, a set of applications may be in the foreground and a set of applications may be in the background in which both sets of applications compete for an output response activity. In conventional systems, applications that require an output response do not cooperate with other applications thereby causing a disruptive interface with the user. The lack of scheduling between these applications may diminish the quality of experience for a user.

For example, a first application with minimal restriction on when to output information, in other words a "chatty" program, may interrupt a second application and output unnecessary information while the second application is outputting an important notification. For instance, a turn-by-turn navigation application may interrupt a podcast by either pausing the podcast or simultaneously outputting to the speaker resulting in "talking over" the podcast without pausing. In cases where the user does not need the audio output of the turn-by-turn navigation (either because the user can see the directions clearly or the user is in a known location), the podcast need not be interrupted. The quality of experience for the user may be adversely impacted by the interruption.

Another example of competing applications may involve a mobile advertisement platform and an application such as a podcast or game. The user may be more inclined to listen to an advertisement if the advertisement was inserted at an appropriate pause in the primary application, for example, podcast or game, such that the advertisement avoids interruptions of critical outputs from the primary application.

Interruptions may adversely impact user experience when the preferred application of the user is paused or interrupted at an ill-timed moment. Moreover, the interruption may adversely impact the performance of the preferred application. Examples of interrupting a preferred application with notifications from a competing application (for example, strict turn-by-turn notifications from a navigation application) may include: interrupting a favorite song from a music application, interrupting a critical move or turn in a game that could impact the user performance in the game, interrupting a phone call resulting in decreased effectiveness of communication, etc.

Various embodiments described herein may improve application output interactions by providing a score for the application that allows the application to dictate if it can be interrupted. An exemplary embodiment includes a mechanism to determine when and how applications may interrupt an application by using recent user interaction to generate scores on selected applications.

Figure 3:
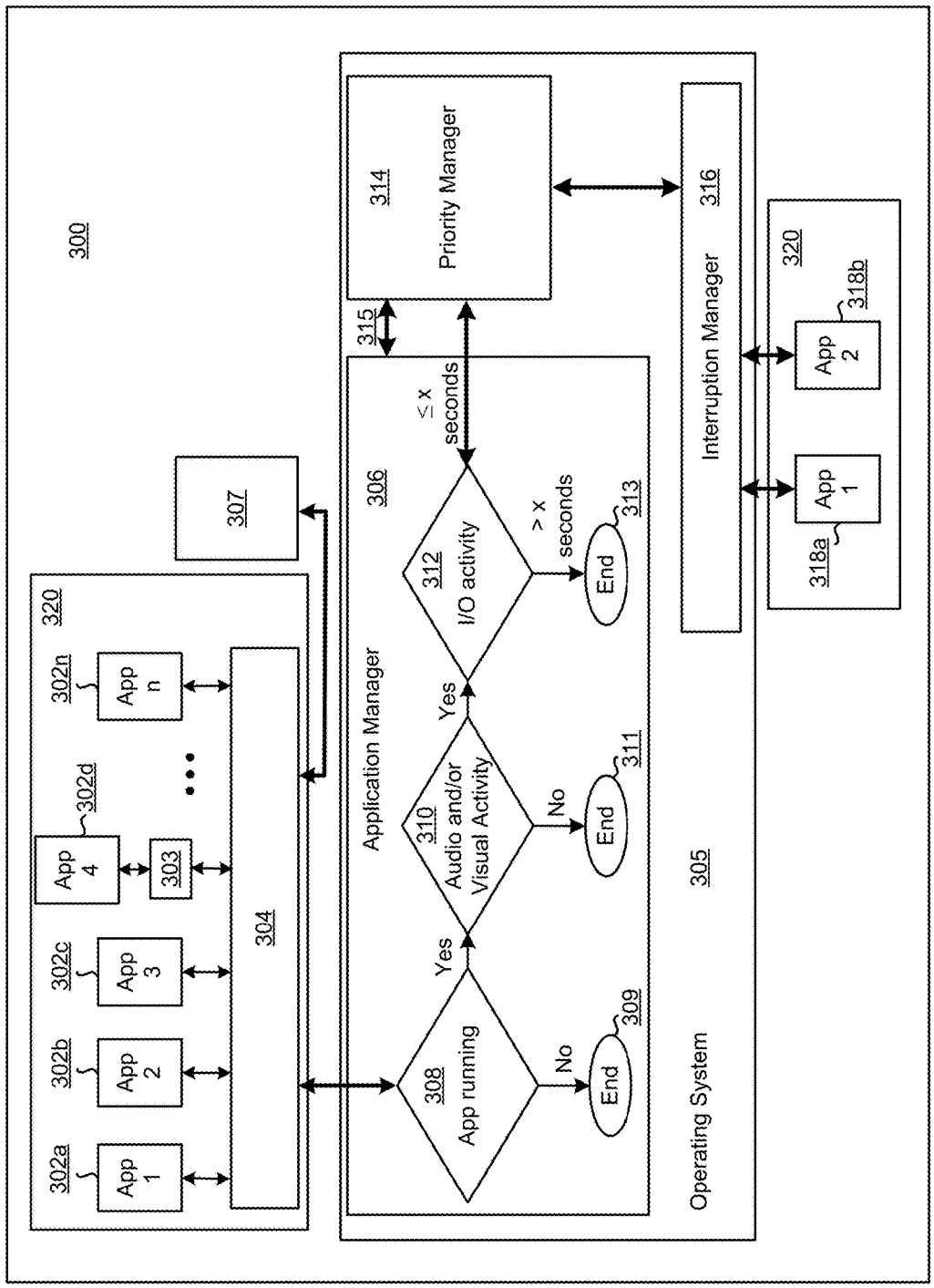
FIG. 3 illustrates a block diagram of the architecture of multi-application system according to one embodiment.

Now referring to FIG. 3, there is shown a block diagram depicting a mobile user device 300 having therein a mechanism to determine priority context based notifications, according to one embodiment. The mobile user device 300 may be a smartphone (e.g. iPhone, android-based phone, etc.), smart watch (e.g. iWatch), tablet (e.g. iPad), etc. The mobile user device 300 may be implemented in accordance with the present invention in any of the environments depicted in the FIGS., among others, in various embodiments. Of course, more or less components than those specifically described in FIG. 3 may be included in mobile user device 300, as would be understood by one of skill in the art upon reading the present descriptions.

As shown in FIG. 3, the mobile user device 300 is configured as a multi-application based system having thereon a mechanism to determine context-based notifications. The mobile user device 300 may include one or more applications (App 1 . . . App n) 302a, 302b, 302c, 302d, or 302n any or all of which may provide output responses, for example, audio, visual, haptic, and/or textual output depending on context. There may be any number of applications (302a, 302b, 302c, 302d, or 302n) on the mobile user device 300.

Some or all of the applications 302a-302n may be run in the user space 320 on the mobile user device 300. The user space 320 may be defined as code that runs outside of the operating system (OS) 305, the OS 305 being the system software that manages the hardware and software of the mobile user device 300. Applications 302a-302n on mobile user device 300 are typically run in user space 320. In order to interact with the user, through screen response, audio, visual, etc, applications 302a-302n in user space 320 send requests to the operation system 305 as per the user interactions.

Applications 302a-302n generate importance scores that indicate the importance of a particular application. In some approaches, the importance score may be relevant only to the individual application generating the importance score. In other approaches, an application may generate an importance score that scores that application compared to another application at any given moment. For example, an application 302a-302n generates an importance score each time the user interacts with that application and reports favorable times for interruption of that application 302a-302n. The importance score may be in the form of a number, a ranking, any type of measurement that signifies the application's importance relative to another application, a response to the application relative to a previous response to the same application, etc.

Examples of when an application may provide an importance score may include: a gaming application may generate a score relative to "not a good time to interrupt" when an avatar is almost dead, when most enemies are on screen, right before a jump, if a user is in the middle of a sequence of events/moves, etc.; a phone application may provide a score relative to "a good time to interrupt" when a user reaches the end of a sentence, a prolonged silence, when amplitude of voice is low, etc.; a music application may provide a score relative to "a good time to interrupt" when the user is not singing along to the song, during a chorus, etc.

An Importance Scoring Module (ISM) 304 may be in communication with each application 302a-302n within the user space 320 and receive a real-time feed of the importance scores generated from the applications 302a-302n directly. Alternatively, an importance score estimator application 303 may provide or predict importance scores for certain subscribing application(s) 302d that may not be able to generate importance scores. Some or all of the applications 302a-302n in the user space 320 may use an importance score estimator 303 to generate importance scores relative to the user interactions of a subscribing application, e.g., see subscribing application 302d, and through the importance score estimator 303 provide a feed of importance scores to the ISM 304. For example, an importance score estimator may determine important parts of video clips of a video application, may determine interest in a particular webpage, may detect interruption in audio conversations, etc.

In addition, the ISM 304 may be configured to normalize the importance scores of some or all of the incoming feeds from the various applications 302a-302n in the user space 320. Applications 302a-302n may not provide importance scores of similar numerical range, for example one application may provide importance scores from 1 to 100 and a second application may provide importance scores from 0 to 1. Thus, the ISM 304 may normalize importance scores from applications to the same range. An example of normalizing an importance score by the ISM 304 may involve allocating a "1"= for scores that indicate a good time for interruption, and a "0"= for scores that indicate not a good time for interruption. Any known method of normalizing values may be used to normalize the importance scores of the applications. If future metrics of applications involve applications giving importance scores using a universally accepted range, the ISM may not need to normalize the importance scores of applications.

The ISM 304 provides the Application Manager (AM) 306 in the Operating System (OS) 305 on the mobile user device 300 a time series feed of normalized importance scores from each application 302a-302n, including feeds of importance scores from application(s) 302d through the importance score estimator 303.

Moreover, other services 307 may subscribe to the output of feeds of normalized importance scores provided by the ISM 304. In some approaches, the other services 307 may be in the OS 305. In other approaches, the other services 307 may be in the user space 320.

Within the OS 305, the AM 306 determines which applications 302a-302n in the user space 320 may be selected applications to be considered for assignment of interruption priority. The AM 306, through a series of decisions, determines which applications 302a-302n that provide feeds of importance scores to the ISM 304 may be currently relevant to the user and thus are candidates for assignment of interruption priority. The AM 306 utilizes information provided by the OS 305 of the user device 300, for example, whether the application is running, whether the application uses audio and/or visual resources, and which application had an input/output (I/O) activity in the last x seconds.

Looking to FIG. 3, the AM 306 processes the feed of normalized importance scores of each application provided by the ISM 304 through a series of decisions within the AM 306. In the illustrative embodiment, the AM 306 may initially determine whether the application is currently running in decision 308. If the decision is no, the application is not running, then the application ends at 309 and may not proceed as a participating application. If the application is running, the AM 306 decides whether the application is currently using audio and/or visual output in decision 310. If the application is not using audio and/or visual output, and thus would not compete with other applications for audio and/or visual output, then the application ends 311 and may not proceed as a participating application. If the application is using audio and/or visual output, then the AM 306 decides whether the application had any I/O activity as determined in operation 312 in the last x seconds. If there was no I/O activity in the last x seconds, e.g., the time may be greater than x (x may be predefined; retrieved from memory; set by a user or administrator, etc.), then the application ends 313 and may not proceed as a selected application. If the application has had I/O activity within the last x seconds, e.g., the time may be less than or equal to x, then the AM 306 provides the feed of normalized importance scores of this selected application to the Priority Manager (PM) 314. In some approaches, x may be equal to infinity such that all running applications may proceed as selected applications to the PM 314.

The PM 314 assigns a prioritization score to each selected application based on a function of the feed of importance scores of the selected applications and the context of user's actions. The PM 314 continuously interacts with the AM 306 while receiving feeds of importance scores from selected applications to assess user's actions related to these applications (indicated by the double arrow 315 between the PM 314 and the AM 306). The PM 314 may react to user input related to an application received in the AM 306 and adjusts the prioritization of that application. In some embodiments, the AM 306 and the PM 314 may be combined as one manager.

The PM 314 may assign a prioritization score to each application according to context-based rules. For example, the PM 314 may consider user interactions such as multiple demands for speaker, haptic feedback, portion of screen, etc. Context-based prioritization may include the following: frequency of application use during the user's current contextual activity, frequency of application output during the user's current contextual activity, etc.

The PM 314 may assign a prioritization score to each application according to rules based on machine learning, crowd-sourcing, etc. Such rules may include context-based rules. The PM 314 may also assign prioritization scores based on user input, for example, when user is driving, when user is walking, etc. In some approaches, the PM 314 may assign prioritization scores based on prioritization input provided from a service provider.

To further illustrate the PM 314 assignment of the prioritization scoring based on context, the following considers two applications running at the same time: a navigation application and a podcast application. Both of these applications have output audio responses and have the potential to output audio simultaneously (e.g., "talk over each other"). Thus, the user may set the prioritization score to change the volume of each application. The prioritization score "P" reflects the importance and relevance of each application. An example may be:

| Context A, when the user is far from home |
|---|
| Navigation     P = 0.90 |
| Podcast        P = 0.10 |
| User may not know area, so Navigation receives a higher score |

| Context B, when user is close to home |
|---|
| Navigation     P = 0.10 |
| Podcast        P = 0.90 |
| User likely knows the area, so Podcast receives a higher score |

The PM 314 assigns a prioritization score so that the application with the higher prioritization score has priority to interrupt and/or dominate the output response. In the above example, when the user is far from home, the volume of the podcast may be reduced so that the user is able to hear the navigation commands, and conversely, when the user is near home, the volume of the navigation commands may be reduced so the user can continue to hear the podcast.

Similar to the AM 306, the PM 314 preferably runs in the OS 305 and thus has access to user and application information. In addition to the parameters used by the AM 306, the PM 314 also utilizes current phone, use, application, and surrounding area context to calculate the prioritization score of the applications.

A possible third manager in the OS 305 is the Interruption Manager (IM) 316 as illustrated in FIG. 3. After the PM 314 assigns a prioritization score to a selected application 302n, the real-time feeds of importance scores of the selected applications 302n (selected by the AM 306) are received by the IM 316.

The IM 316 may combine the normalized importance scores of the selected applications into a single feed depending on the prioritization score of the selected application. Then the IM 316 may provide the single feed of normalized importance scores of selected applications in order of priority to subscribing applications 318a, 318b in the user space 320 so that the subscribing applications 318a, 318b may determine, for example, how to interrupt the selected applications 302n, when to interrupt the selected applications 302n, when to allow the selected application 302n to interrupt the subscribing application 318a, 318b, etc. The IM 316 may continuously alter the single feed to adjust to changes prioritization of the selected applications 302n in user context in real time.

In an illustrative embodiment in FIG. 3, an Application Program Interface (API) of the IM 316 may allow filters, requests, rules, etc. from subscribing applications 318a, 318b to interpret a single feed of importance scores.

In some approaches, the subscribing application may also be a selected application 302n. Moreover, the subscribing applications 318a, 318b, that may or may not include a selected application 302n, may interact with the IM 316 (double arrow between the subscribing application 318a, 318b and the IM 316) and further connect with the PM 314 (double arrow between the IM 316 and PM 314) to possibly acquire a higher prioritization score (or a lower prioritization score) for the subscribing application 318a, 318b. For example, if the selected application is maintaining a high priority score (e.g., in the middle of a story of a podcast) and the navigation application (subscribing application) needs to output a direction, the navigation application may "revisit" the PM 314 to acquire a prioritization score that provides parameters for when the navigation application may interrupt the podcast.

In one embodiment, the OS 305 may utilize the interruption information of IM 316 which processes the interruption information within the OS 305, and in turn the OS 305 may manage the output notifications for selected and subscribing applications. The OS 305 by accessing the interruption information from the IM 316, the OS 305 may determine when and how one application may interrupt another application. For example, if a selected application and a subscribing application both have high prioritization scores and are trying to output at the same time, then the OS 305 may allow for the selected application to output first. The OS 305 may delay the output of subscribing application. When the selected application has completed the output, and then the OS 305 may allow the subscribing application to proceed with an output. In some approaches, the OS 305 may allow the subscribing application to output before the selected application. In other approaches, the OS 305 may manage two selected applications with the same high priority. In yet other approaches, the OS 305 may change the type of output of one of the competing applications with high priority and allow output the two applications simultaneously using different types of output.

Figure 4:
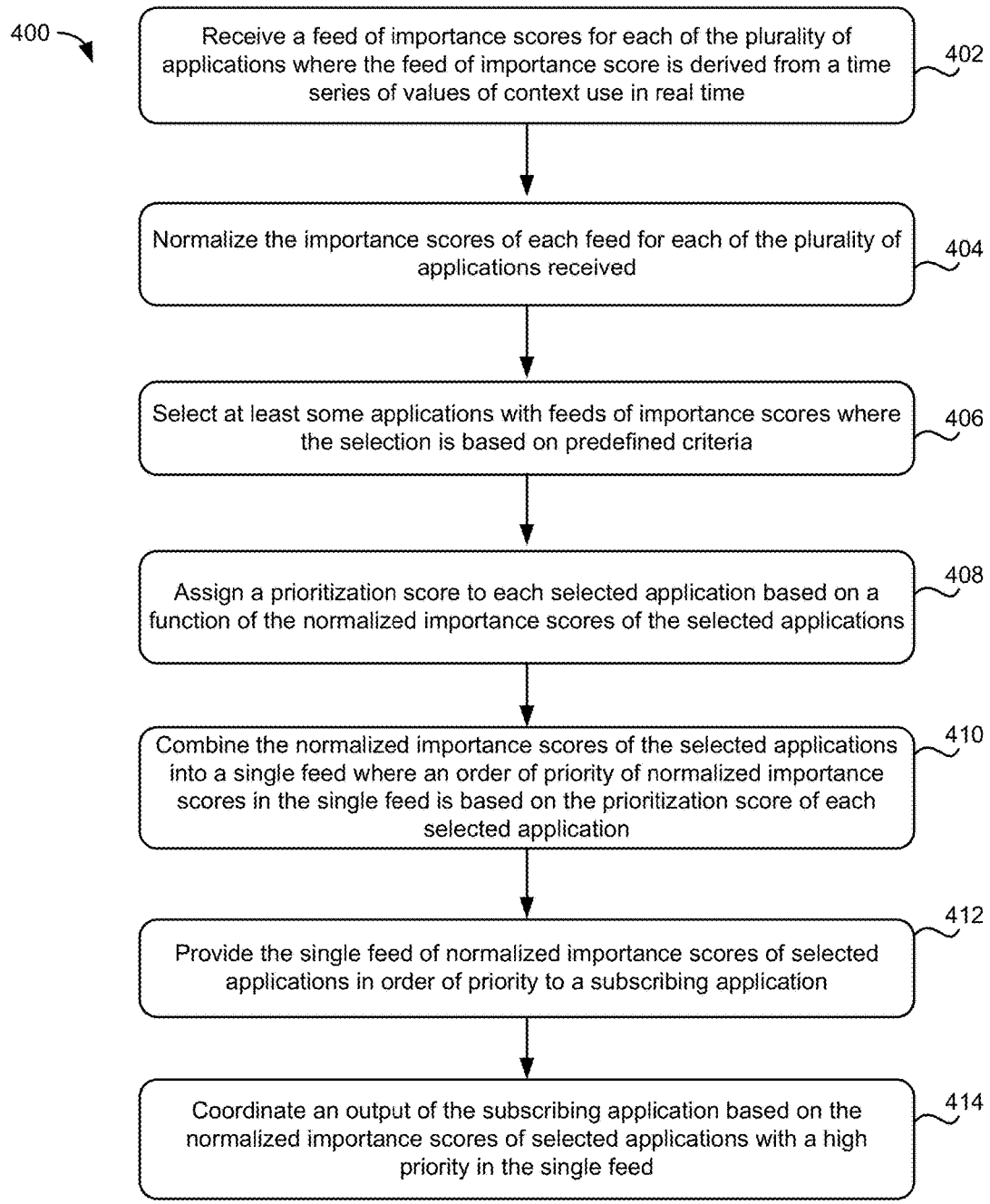
FIG. 4 shows a flowchart diagram of the method of context-based notifications in a multi-application system according to one embodiment.

Now referring to FIG. 4, a flowchart of a method 400 is shown according to one embodiment. The method 400 may be performed in accordance with the present invention in any of the environments depicted in FIGS., among others, in various embodiments. Of course, more or less operations than those specifically described in FIG. 4 may be included in method 400, as would be understood by one of skill in the art upon reading the present descriptions.

Each of the operations of the method 400 may be performed by any suitable component of the operating environment. For example, in various embodiments, the method 400 may be partially or entirely performed by a cloud server, a mainframe computer, a host, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 400. Illustrative processors include, but are not limited to, a CPU, an ASIC, a FPGA, etc., combinations thereof, or any other suitable computing device known in the art.

As shown in FIG. 4, method 400 coordinates output of an application over a single computing device where the device may have a plurality of applications. Method 400 may initiate with operation 402 where a feed of importance scores is received for each of the plurality of applications, where the feed of importance score may be derived from a time series of values of context use in real time. In some approaches, the feed of importance scores of an application may be provided by the application. In other approaches, the feed of importance scores of an application may be provided by an importance score estimator.

In operation 404, the method 400 involves normalizing the importance scores within each feed provided by the applications. Referring to FIG. 3, the ISM 304 in the user space 320 receives the feeds of real time importance scores from the applications and normalizes the importance scores within the feeds so that the scores being received may be compared between applications 302a-302n. The individual applications may have custom scoring methodologies for designating the importance scores for each real time feed, thus the ISM 304 may normalize the importance scores of different application to one scale.

Operation 406 involves selecting at least some applications with feeds of importance scores, where the selection is based on predefined criteria. Referring back to FIG. 3, the AM 306 within the operating system 305 of the mobile user device 300 selects the feeds of importance scores from applications that meet predefined criteria, for example, whether the application is running, whether the application has audio activity, whether the application has visual activity, and/or whether the application has had an I/O request within a defined time period. The time period may be predetermined from when the application was initiated, some specified time period such as 10 seconds or less, etc.

In continued reference to FIG. 4, operation 408 involves assigning a prioritization score to each selected application based on a function of the normalized importance scores of each selected application provided by the AM 306.

In various embodiments, the PM assigns a prioritization score of the selected applications provided by the AM. For example, the PM may assign a prioritization score to each selected application based on an activity of the application.

In one embodiment of operation 408, the prioritization score of each selected application may be based on the activity of the application of spending time in foreground on the user device in which longer times in the foreground may reflect a higher prioritization score. Thus, the formula to calculate the prioritization score (P) may include the ratio of how long (in last x timeframe) an application a spent in the foreground under a certain context c ($L_a(c)$) versus the sum of the other active applications (AS) in the foreground ($\Sigma_{i \in AS(x)} L_i(c)$) (see Equation 1 below). The prioritization score of the application may be bound by a minimum priority.

$$P_a(c) = \frac{L_a(c)}{\sum_{i \in AS(x)} L_i(c)} \geq \text{a minimum prioritization} \quad \text{Equation 1}$$

In another embodiment of operation 408, the prioritization score of each selected application may be based on the activity of the application of sending notifications in a defined time period. For example, the formula to calculate the prioritization score (P) of the amount of notifications includes the ratio of how many notifications (in last x timeframe) an application a sent in a certain context c ($N_a(c)$) versus the sum of the other active applications (AS) sending notifications in the last x time frame ($\Sigma_{i \in AS(x)} N_i(c)$) (see Equation 2 below). Moreover, the inverse may be calculated as well, as shown in Equation 3 below.

$$P_a(c) = \frac{N_a(c)}{\sum_{i \in AS(x)} N_i(c)} \quad \text{Equation 2}$$

$$P_a(c) = \frac{\sum_{i \in AS(x)} N_i(c)}{N_a(c)} \quad \text{Equation 3}$$

In yet another embodiment of operation 408, the prioritization score of each selected application may be based on the activity of the application of the amount of times the application is switched to the foreground in a defined time period. For example, the formula to calculate the prioritization score (P) of the amount of times an application a has switched to the foreground (in last x timeframe) in a certain context c ($B_a(c)$) versus the sum of the other active applications (AS) switching to the foreground in the last x time frame ($\Sigma_{i \in AS(x)} B_i(c)$) (see Equation 4). B may only be counted when a background application notifies the user when the application is switched from background to foreground.

$$P_a(c) = \frac{B_a(c)}{\sum_{i \in AS(x)} B_i(c)} \quad \text{Equation 4}$$

In various embodiments of operation 408, the PM may use other tools and parameters to assign prioritization scores to selected applications. The PM may utilize user feedback in a defined period such that each notification may be accompanied by a feedback mechanism that is used to determine prioritization score of each selected application, for example, if an application prompts the user to respond on the phone, e.g., accept a notification, tap the phone, etc., or if the application prompts the user to change the application state. Alternatively, the PM may utilize real time user adjustments and pauses of the application settings under a certain context. In some approaches, the PM may utilize user behaviors and/or feedback that help define a rating system, for example, a "thumbs up" or a "thumbs down" indication on the phone, or the user says "good job" or "bad job" using voice activated processes, etc. The PM may learn the user behaviors over time and may establish a system of priority for the user of the device.

In another embodiment of operation 408, the PM may utilize location, activity or other user-based contexts as mentioned above in the example of Context 1 and Context 2 with the navigation application running simultaneously as the podcast. In some approaches the prioritization score of each selected application may be based on user location or activity. In other approaches, the prioritization score of an application may be determined based on whether the user and/or selected applications fed into the PM send a notification that causes the contexts to change. For example, an application may receive a higher prioritization score when that application causes a context to change.

In one embodiment of operation 408, a prioritization score of each selected application may follow predefined rules set by the user. For example, when a user is engaged in a fitness routine, such as running, a fitness tracking application may have a higher prioritization than a weather application. Or as another example, when a user is at home, a video watching application may have a higher prioritization. The user or an external party may specify relative weights or orderings for a given context for prioritizing applications in the PM, which may be stored and/or applied.

In another embodiment of operation 408, a prioritization score of each selected application may be based on crowd-sourcing with formulas used for prioritizing applications on one mobile user device, for example, L(c) over an arbitrary set of users and apply for a prioritization score of the application on the user mobile device. In other approaches, L(c) may be targeted to a set of users with similar characteristics of the user, or may be used to group sets of application priorities together. In some approaches of operation 408, the PM may assign a prioritization score of a selected application based on the prioritization scores of nearby users of the same application. In other approaches of operation 408, the PM may assign a prioritization score of a selected application based on users' contexts, rules and prioritization scores of users currently surrounding the user.

In various embodiments of operation 408 of method 400, the prioritization score of each selected application may be a function of user context. In one approach, the prioritization score may be a function of application context. In another approach, the prioritization score may be a function of device context, for example, device type (watch, phone, tablet, etc.) or device characteristics (screen size, battery capacity remaining, network connectivity, etc). In yet another approach, the prioritization score may be function of predicted context. The PM may calculate the prioritization score using conventional methods to obtain context information about the user relative to the selected applications. Various methods include Application Programming Interfaces (APIs) that can determine activity of the user, for example, walking, resting, in a car, biking, etc.; location information gathered from sensors on the mobile user device, for example, audio, video, movement, nearby devices, etc.; and prediction of user application usage. The PM may determine a relative importance of each application in terms of the application's I/O based on user context.

In one embodiment of operation 408 of method 400, the prioritization score of each selected application may be recalculated after a predefined amount of time. In another embodiment, the prioritization score of each selected application may be recalculated based on contextual changes. The PM may continuously assign prioritization scores in real time to selected applications based on the real time activity of the selected applications.

In operation 410, the feeds of normalized importance scores of the selected applications are combined by the IM into a single feed where an order of priority of normalized importance scores in the single feed may be based on the prioritization score of each selected application given by the PM in operation 408.

In some approaches, the IM may utilize one or more APIs that allows for filters, requests, or rules from selected applications that provide priority information for combining the feeds into a single feed based on prioritization scores. In other words, two applications created by the same application developer may have rules in place to run synchronously with each other. For example, a navigation application may already run synchronously with a sister natural language interface application that gives information upon request from the user. These rules already allow the navigation application to place a low weight on the sister application but place a higher weight on a podcast. Thus, the IM may incorporate the rules provided by the navigation application into the single feed of prioritization scores.

In operation 412 the IM may provide the single feed of normalized importance scores of selected applications in order of priority to a subscribing application. The IM may have a set of APIs from the operating system to allow applications to subscribe to the interruption feed, and to set the policies for the interruption feed. In some approaches, the IM may provide the single feed of importance scores based on the prioritization score of a selected application to more than one subscribing application. In other approaches, the subscribing application may be a selected application with a prioritization score. The subscribing application may be an application that demands use of the audio and/or visual output in competition with selected applications running concurrently on the device.

Method 400 provides an opportunity for a subscribing application to improve the quality of experience of the user by utilizing a prioritized interruption feed, e.g., the single feed of the series of scores being provided by the IM, of selected applications running on the device to determine when and how to interrupt these selected applications.

Operation 414 involves coordinating an output of the subscribing application based on the normalized importance scores of selected applications with a high priority in the single feed being provided by the IM. In various embodiments, the type of output of the subscribing application may include audio output. In some approaches, the type of output of the subscribing application may include video output. In other approaches, the type of output of the subscribing application may be haptic output. In yet other approaches, the type of output of the subscribing application may be textual output. Moreover, the output of the subscribing applications may also be a combination of outputs, for example, audio output and textual output, textual output and haptic output, etc.

The subscribing applications may monitor the incoming single feed from the IM on when and how to interrupt the selected application with a necessary notification. The subscribing application may determine the type of interruption (e.g., when to interrupt, duration of interruption, choice of output, etc.) depending on the score from the interruption feed. In one example, the subscribing application may be a navigation application and the selected application may be a podcast application, and both are using the audio output of the device. The subscribing application (navigation application) may determine when the selected application (podcast application) is interrupted based on the importance score of the selected application in the interruption feed. In addition, the subscribing application (navigation application) may determine how to interrupt the subscribing application based on the importance score of the selected application in the interruption feed. If the importance scores of the selected application (podcast) are higher than the subscribing application (navigation), then the selected application (podcast) should not be interrupted, and thus, the subscribing application (navigation application) that has a necessary output may provide a short output (for example, "turn left"). If the importance score of the selected application (podcast) reaches a low importance score that may reflect a local minimum or break in story that coincides with a necessary notification of the subscribing application (navigation application), then, the selected application (podcast) may be interrupted by a more descriptive output from the subscribing application (navigation application) (for example, "In 300 ft, turn left on John Jack Blvd from the middle lane").

Another example of when a subscribing application may interrupt may be as follows. A navigation application (subscribing application) may change from offering a fixed point of interruption (e.g. 100 meters before turn) to a range of interruption opportunities (e.g. between 50 to 300 meters before turn) and then the navigation application may choose the appropriate distance for interruption according to the score of the interruption feed of importance scores of the selected application (a podcast application).

The following is an example of how a subscribing application (navigation application) may interrupt. A navigation application is provided a low score from the interruption feed, then the interruption from the navigation application may be long, e.g., thorough direction. However, if the navigation application is provided an interruption feed of the selected application with high scores above a threshold, or scores that do not show a local minimum, then the interruption from the navigation application may be brief, e.g., a concise direction. The navigation application may output at a designated point, for example at 50 meters before a turn. The output by the subscribing application may be a brief audio output, a haptic response, a textual response, etc. In some approaches, the output may be combination of output responses.

In a preferred embodiment of operation 414 of method 400, the subscribing application may have a first threshold of notification and a second threshold of a user characteristic. The second threshold may be dependent on characteristics that are changing in real time, for example, time remaining or time to complete task, distance from home or destination or next notification, user response appropriateness, user context, etc. Thus, the second threshold may correspond to the derivative of the interruption feed, e.g., the slope, rather than the value of the interruption feed (first threshold).

Furthermore, the second threshold may provide an opportunity for the subscribing application to output a notification if the slope of the interruption feed begins to decrease, e.g., approach a lower priority level. The subscribing application may initiate an output of a brief notification if the second threshold is met even though the first threshold has not been met.

In one embodiment, the output of the subscribing application may be initiated when the feed of importance scores of the selected application with high priority is lower than the first threshold. Moreover, the output of the subscribing application may be adjusted, either shortened or lengthened, when the feed of importance scores of the selected application with high priority approach a slope relative to the second threshold.

For example, the subscribing application may have a first threshold of notification such that the subscribing application may only interrupt the selected application when the score from the interruption feed falls below 0.2, and thus has a priority score that is lower than the first threshold; and the second threshold may provide a limit of time to output the notification because the slope of the importance scores of high priority is increasing, e.g. deliver the notification in 5 seconds. Alternatively, if the slope of importance scores of high priority is decreasing, the time for notification delivery may be lengthened.

In another embodiment of operation 414, the second threshold of a user characteristic may correspond to distance, e.g., the length of notification may be relevant to the user's distance from a familiar area. In yet another embodiment, the second threshold of a user characteristic may correspond to user response appropriateness. In yet another embodiment, the second threshold of a user characteristic may correspond to the user context.

In one embodiment of operation 414, the output of the subscribing application may be initiated when a local minimum of the feed of importance scores of the selected application with high priority is determined.

In one embodiment of operation 414, the characteristics of the output of the subscribing application may be determined by the feed of importance scores of the selected application with high priority. In other approaches, the characteristics of the output of the selected application may be determined by the feed of importance scores of the subscribing application if the subscribing application has a higher priority than the selected application.

In another embodiment of operation 414, the characteristics of the output of the subscribing application may include length of response as a characteristic of input/output response. In another approach of operation 414, the characteristics of the output of the subscribing application may include quality of response as a characteristic of input/output response. In yet another approach of operation 414, the characteristics of the output of the subscribing application may include type of I/O.

In some approaches, the application with the higher importance scores may determine that the competing application change the I/O response to a combination of haptic and textual output rather than audio output.

In one embodiment, the subscribing application may coordinate the running of the subscribing application based on the interruption feed provided by the IM. For example, a music application that is subscribing to the interruption feed may play no cost music, or soft sounding music when the priority score of the interruption feed is high priority and the risk of being interrupted is high. Then, conversely, when the interruption feed is low priority, the music application plays favorite music that may cost money or play louder music.

Users may operate multiple mobile computing devices, for example, a smart phone, a tablet, a watch, etc. Moreover, one or more applications may run on all of these devices concurrently. Thus, it would be desirable to coordinate the output of the applications over a distributed set of devices running similar applications. Various embodiments described herein coordinate and prioritize application usage and I/O responses distributed over multiple devices.

Figure 5A:
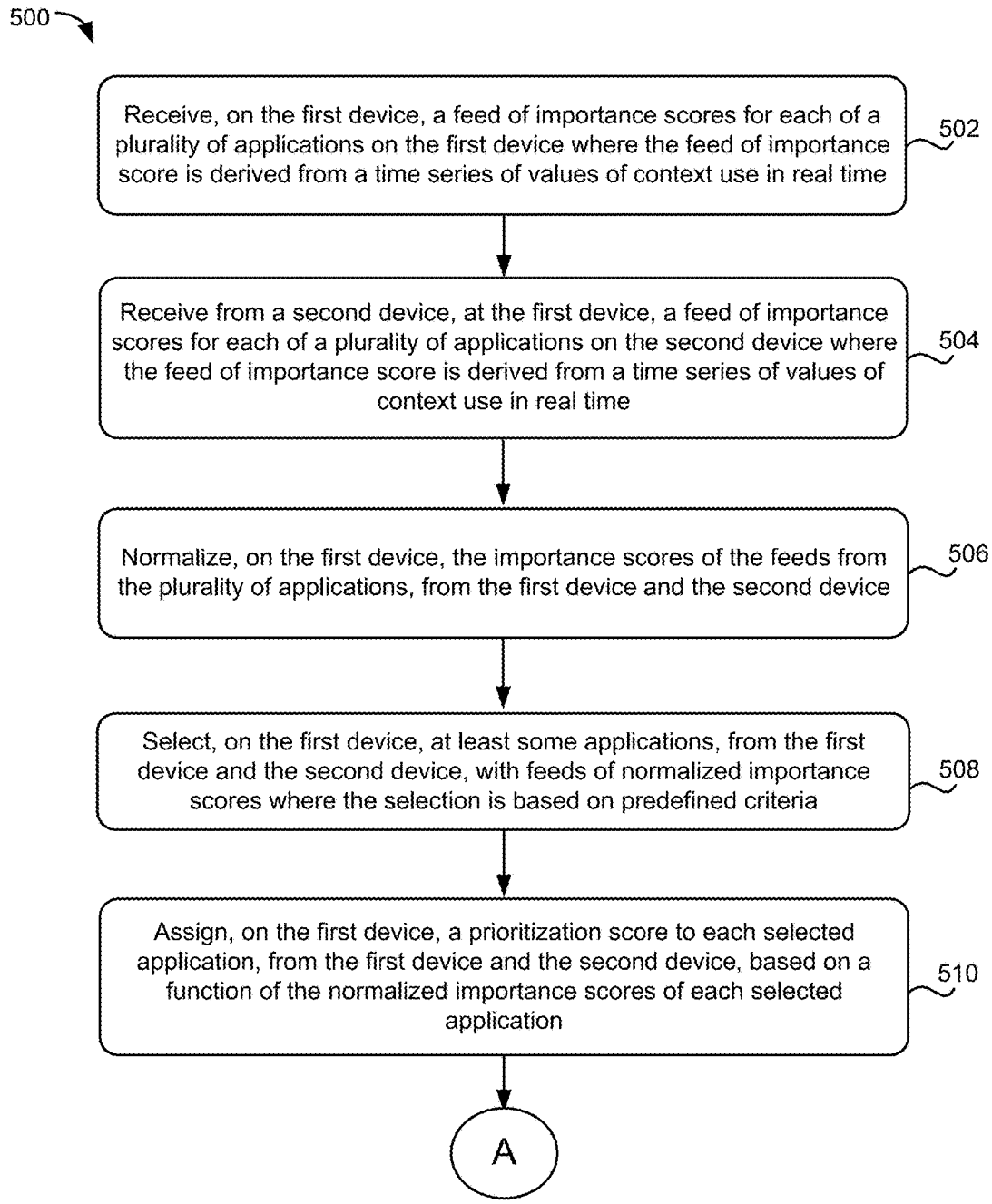
FIGS. 5A-5B show a flowchart diagram of a method of context-based notifications in a multi-application system in more than one device according to one embodiment.
Figure 5B:
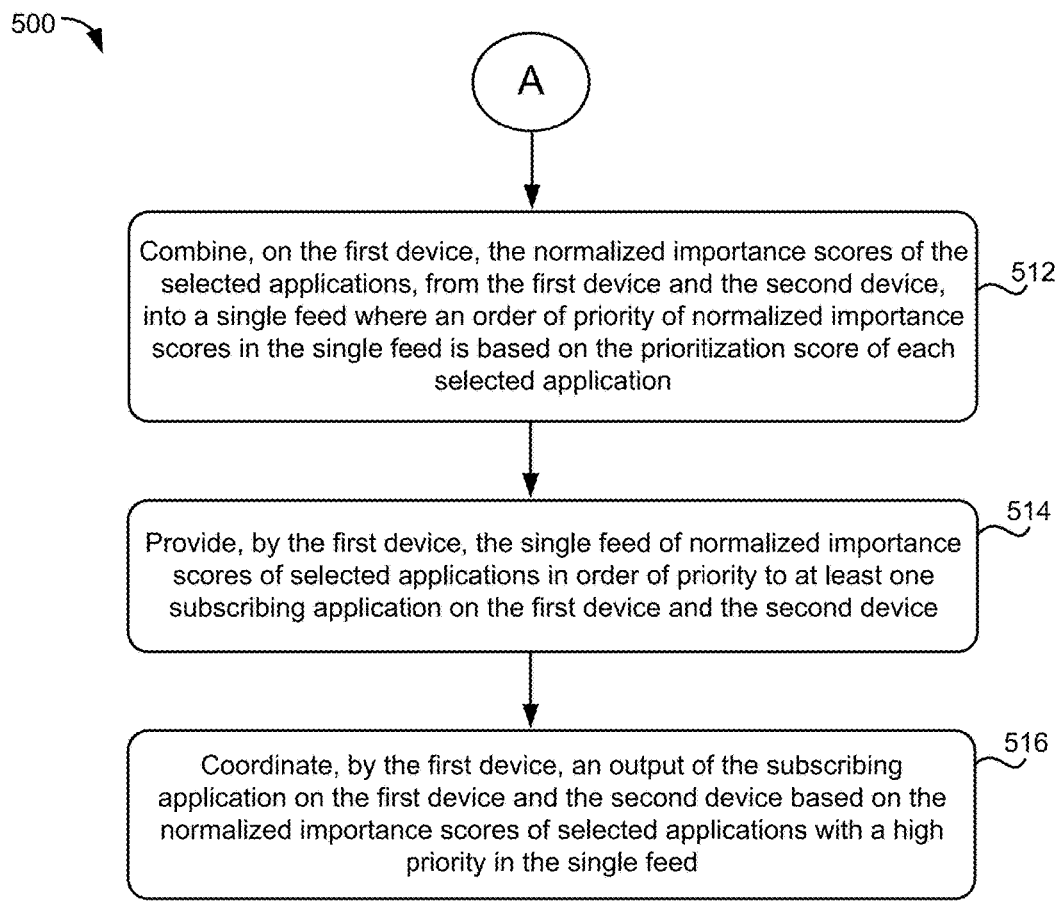

Now referring to FIGS. 5A-5B, a flowchart of a method 500 is shown according to one embodiment. The method 500 may be performed in accordance with the present invention in any of the environments depicted in FIGS., among others, in various embodiments. Of course, more or less operations than those specifically described in FIGS. 5A-5B may be included in method 500, as would be understood by one of skill in the art upon reading the present descriptions.

Each of the operations of the method 500 may be performed by any suitable component of the operating environment. For example, in various embodiments, the method 500 may be partially or entirely performed by a cloud server, a mainframe computer, a host, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a CPU, an ASIC, a FPGA, etc., combinations thereof, or any other suitable computing device known in the art.

As shown in FIG. 5A, method 500 is a method for a first device to coordinate output of a plurality of applications over a first device and a second device according to one embodiment. The user may designate one device as the first device or local leader device, for example the smart phone, tablet, cloud, etc., to coordinate output of the application over a distributed set of devices running the same application. Method 500 may initiate with operation 502 where the first device receives a feed of importance scores for each of a plurality of applications on the first device. Moreover, the feed of importance score for each application may be derived from a time series of values of context use in real time In operation 504, the first device may receive from a second device a feed of importance scores for each of a plurality of applications on the second device where the feed of importance score for each application may be derived from a time series of values of context use in real time.

In operation 506, the first device may normalize the importance scores of each feed of the plurality of applications from the first device and second device.

In operation 508, the first device may select at least some applications, from the first device and the second device, with feeds of normalized importance scores where the selection may be based on predefined criteria. The AM (Application Manager) may reside on the first device (or local leader device) and may operate to pull applications that are running on other devices within the distributed set of devices. The AM on the first device may use information from the operating system on the first device and the second device, third device, etc. to help determine if the application qualifies to continue to an interruption feed as a selected application.

In operation 510, the first device may assign a prioritization score to the selected applications, from the first device and the second device, based on a function of the normalized importance scores of each selected application. The PM (Priority Manager) on the first device may assign the prioritization scores to the selected application provide the prioritization scores of the selected applications to the IM (Interruption Manager).

Referring to FIG. 5B, in operation 512 of the method 500, the IM on the first device may combine the normalized feeds of importance scores of the selected applications, from the first device and the second device, into a single feed where an order of priority of normalized importance scores in the single feed may be based on the prioritization score of each selected application. In some approaches, there may be a third device, fourth device, etc. in the distributed set of devices. The IM on the first device may disseminate the interruption feed, e.g., the single feed of normalized scores of importance in order of priority, to the distributed set of devices that are running the selected application.

In operation 514, the first device may provide the single feed of normalized importance scores of selected applications in order of priority to at least one subscribing application on the first device and the second device.

In operation 516, the first device may coordinate an output of the subscribing application on the first device and the second device based on the normalized importance scores of selected applications with a high priority in the single feed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

Examples of Context-Based Notifications in a Multi-Application Based System

Game Application and Phone Application

The user is playing a game application (selected application), and is at a critical point in the game, e.g., is winning or is almost out of health, there are many enemies on the screen, the user is about to make a vertical jump, etc. Various embodiments described herein may coordinate the phone application (subscribing application) to provide a notification when the game has a pause or reaches a local minimum of activity. The game application may adjust the phone application to respond to phone notification by textual response rather than audio or visual. In addition, the phone application may respond as "busy, with a message" to phone notification Phone Application and Navigation Application The user is using the hands free phone application (selected application) on a mobile device and is in a serious conversation. Various embodiments described herein may coordinate the navigation application (subscribing application) to interrupt at an appropriate time. The Priority Manager would use conventional tools for prioritizing the feeds, for example, natural language techniques, machine learning, etc., that provide an indication in the interruption feed that there is a pause in the conversation. The navigation application may avoid interrupting important phrases, for example, "oh, your Dad just passed away" accompanied by a long silence. Although there is a silence, the associated phrase indicates that the subscribing application should avoid interruption.

Music Application and Navigation Application

The user is using a music application (selected application) to listen to music and also sing along to favorite songs. Various embodiments described herein may coordinate the navigation application (subscribing application) to delay interruption according to the interruption feed that integrates the rankings of songs being played according to the music application rules, or detection of audio input (singing along) so that the directions from the navigation application will be output when the user has finished singing along to a song, or until a favorite song is finished. In such a case, the output of the navigation application (subscribing application) may be a text message.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method to coordinate output of an application over a single computing device wherein the device has a plurality of applications, the method comprising:
   receiving a feed of importance scores for each of the plurality of applications wherein the feed of importance score is derived from a time series of values of context use in real time;
   normalizing the importance scores of each feed for each of the plurality of applications;
   selecting at least some applications with feeds of importance scores wherein the selection is based on predefined criteria;
   assigning a prioritization score to the selected applications based on a function of the normalized importance scores of the selected applications;
   combining the normalized importance scores of the selected applications into a single feed wherein an order of priority of normalized importance scores in the single feed is based on the prioritization score of each selected application;
   providing the single feed of normalized importance scores of selected applications in order of priority to a subscribing application; and
   coordinating an output of the subscribing application based on the normalized importance scores of selected applications with a high priority in the single feed.

2. The computer-implemented method of claim 1, wherein the feed of importance scores of an application is provided by the application.

3. The computer-implemented method of claim 1, wherein the feed of importance scores of an application is provided by an importance score estimator.

4. The computer-implemented method of claim 1, wherein selection of the application with a feed of importance scores is based on a series of predefined criteria including:
   whether the application is running,
   whether the application has audio activity,
   whether the application has visual activity,
   whether the application had had an input/output (I/O) request within a defined time period.

5. The computer-implemented method of claim 1, wherein the prioritization score of each selected application is based on an activity of the application, wherein the activity is one or more activities selected from a group consisting of:
   spending time in foreground,
   sending notifications in a defined time period,
   switching to foreground in a defined time period,
   receiving user feedback in a defined time period, determining importance of user location,
following user-defined rules,
crowd sourcing over an arbitrary set of users, and
crowd sourcing over a targeted set of users with similar characteristics of a user.

6. The computer-implemented method of claim 5, wherein the prioritization score of each selected application is a function of at least one context selected from a group consisting of: user context, application context, device context, and predicted context.

7. The computer implemented method of claim 1, wherein the prioritization score of each selected application is recalculated after a predefined amount of time.

8. The computer implemented method of claim 1, wherein the prioritization score of each selected application is recalculated based on contextual changes.

9. The computer-implemented method of claim 1, wherein the output of the subscribing application includes at least one output selected from a group consisting of audio output, video output, haptic output, and textual output.

10. The computer-implemented method of claim 1, wherein the subscribing application has a first threshold of notification and a second threshold of at least one user characteristic selected from a group consisting of time, distance, user response appropriateness, and user context.

11. The computer-implemented method of claim 10, wherein the output of the subscribing application is initiated when the feed of normalized importance scores of the selected application with high priority is lower than the first threshold.

12. The computer-implemented method of claim 10, wherein the output of the subscribing application is adjusted when the feed of normalized importance scores of the selected application with high priority approach a slope relative to the second threshold.

13. The computer-implemented method of claim 1, wherein the output of the subscribing application is initiated when a local minimum of the feed of normalized importance scores of the selected application with high priority is determined.

14. The computer-implemented method of claim 1, wherein characteristics of the output of the subscribing application are determined by the feed of normalized importance scores of the selected application with high priority.

15. The computer-implemented method of claim 14, wherein characteristics of the output of the subscribing application include at least one characteristic of input/output response selected from a group consisting of length, quality, and type of input/output response.

16. The computer-implemented method of claim 1, wherein the subscribing application is a selected application with a prioritization score.

17. A computer program product for coordinating output of an application over a single computing device wherein the device has a plurality of applications, the computer program product comprising a computer readable storage medium having program instructions embodied therewith wherein the computer readable storage medium is not a transitory signal per se, the program instructions executable by a processing circuit to cause the processing circuit to perform a method comprising:
receiving, by the processing circuit, a feed of importance scores for each of the plurality of applications wherein the feed of importance score is derived from a time series of values of context use in real time;
normalizing by the processing circuit, the importance scores of each feed for each of the plurality of applications;
selecting, by the processing circuit, at least some applications with feeds of importance scores wherein the selection is based on predefined criteria;
assigning, by the processing circuit, a prioritization score to the selected applications based on a function of the normalized importance scores of the selected applications;
combining, by the processing circuit, the normalized importance scores of the selected applications into a single feed wherein an order of priority of normalized importance scores in the single feed is based on the prioritization score of each selected application;
providing, by the processing circuit, the single feed of normalized importance scores of selected applications in order of priority to a subscribing application; and,
coordinating, by the processing circuit, an output of the subscribing application based on the normalized importance scores of selected applications with high priority in the single feed.

18. The computer program product of claim 17, wherein the selection of the application with a feed of importance scores is based on a series of predefined criteria including:
whether the application running,
whether the application has audio activity,
whether the application has visual activity,
whether the application had had an input/output (I/O) request within a defined time period.

19. The computer program product of claim 17, wherein the prioritization score of each selected application is based on an activity of the application, wherein the activity is one or more activities selected from a group consisting of:
spending time in foreground,
sending notifications in a defined time period,
switching to foreground in a defined time period,
receiving user feedback in a defined time period,
determining importance of user location,
following user-defined rules,
crowd sourcing over an arbitrary set of users, and
crowd sourcing over a targeted set of users with similar characteristics of the user.

20. The computer program product of claim 19, wherein the prioritization score of each selected application is a function of at least one context selected from a group consisting of: user context, application context, device context, and predicted context.

* * * * *